(12) United States Patent
Reddy et al.

(10) Patent No.: US 7,287,587 B2
(45) Date of Patent: Oct. 30, 2007

(54) CROSSLINKABLE POLYMER COMPOSITIONS AND ASSOCIATED METHODS

(75) Inventors: B. Raghava Reddy, Duncan, OK (US); Larry S. Eoff, Duncan, OK (US); Eldon D. Dairymple, Duncan, OK (US); Julio Vasquez, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 59 days.

(21) Appl. No.: 11/152,417

(22) Filed: Jun. 14, 2005

(65) Prior Publication Data

US 2006/0278390 A1  Dec. 14, 2006

(51) Int. Cl.
  *E21B 43/22* (2006.01)
(52) U.S. Cl. ............... 166/270; 166/294; 166/300
(58) Field of Classification Search ............ None
  See application file for complete search history.

(56) References Cited

U.S. PATENT DOCUMENTS

| | | | | |
|---|---|---|---|---|
| 4,532,052 A | * | 7/1985 | Weaver et al. | 507/222 |
| 5,246,073 A | * | 9/1993 | Sandiford et al. | 166/295 |
| 5,836,392 A | | 11/1998 | Urlwin-Smith | 166/295 |
| 6,176,315 B1 | | 1/2001 | Reddy et al. | 166/295 |
| 6,192,986 B1 | | 2/2001 | Urlwin-Smith | 166/295 |
| 6,196,317 B1 | | 3/2001 | Hardy | 166/295 |
| 6,607,035 B1 | * | 8/2003 | Reddy et al. | 166/295 |
| 6,764,981 B1 | * | 7/2004 | Eoff et al. | 507/110 |
| 7,091,160 B2 | * | 8/2006 | Dao et al. | 507/224 |
| 2003/0181543 A1 | | 9/2003 | Reddy et al. | 523/130 |
| 2004/0182576 A1 | | 9/2004 | Reddy et al. | |
| 2005/0288190 A1 | | 12/2005 | Dao | 507/224 |

OTHER PUBLICATIONS

Foreign communication related to a counterpart application dated Nov. 10, 2006.

* cited by examiner

*Primary Examiner*—Brian E. Glessner
*Assistant Examiner*—Angela DiTrani
(74) *Attorney, Agent, or Firm*—Robert A. Kent; Baker Botts

(57) ABSTRACT

Crosslinkable polymer compositions comprising an aqueous fluid; a water-soluble polymer comprising carbonyl groups; an organic crosslinking agent capable of crosslinking the water-soluble polymer comprising carbonyl groups; and a water-soluble carbonate retarder. Methods comprising: providing a crosslinkable polymer composition; introducing the crosslinkable polymer composition into a portion of a subterranean formation; and allowing the crosslinkable polymer composition to form a crosslinked gel in the portion of the subterranean formation.

16 Claims, 2 Drawing Sheets

CROSSLINKABLE POLYMER COMPOSITIONS AND ASSOCIATED METHODS

BACKGROUND

The present invention relates to treatment fluids useful in subterranean applications and more particularly, to crosslinkable polymer compositions that comprise an aqueous fluid, a water-soluble polymer comprising carbonyl groups, an organic crosslinking agent capable of crosslinking the water-soluble polymer comprising carbonyl groups, and a water-soluble carbonate retarder.

At some point in the life of a well, it may be desirable to mitigate the flow of fluids through a portion of a subterranean formation that is penetrated by the well. In some instances, it may be desirable to control the flow of fluids introduced into the well so that the flow of the fluid into high permeability portions of the formation may be mitigated. For example, in an injection well, it may be desirable to seal off high permeability portions of a subterranean formation that would otherwise accept most of an injected treatment fluid. By sealing off the high permeability portions of the subterranean formation, the injected treatment fluid may thus penetrate less permeable portions of the subterranean formation.

In other instances, it may be desirable to mitigate the production of undesired fluids (e.g., water) from the well. The production of water with oil and gas from wells constitutes a major problem and expense in the production of oil and gas. While oil and gas wells are usually completed in hydrocarbon-producing formations, a water-bearing zone occasionally may be adjacent to the hydrocarbon-producing formation. In some instances, the higher mobility of the water may allow it to flow into the hydrocarbon-producing formation by way, among other things, of natural fractures and high permeability streaks. In some circumstances, the ratio of water to hydrocarbons recovered may, over time, become sufficiently high that the cost of producing, separating, and disposing of the water may represent a significant economic loss.

One attempt to mitigate the flow of fluids through a portion of a subterranean formation has been to place crosslinkable polymer compositions in a well bore so as to cause them to enter the portion of the subterranean formation such that they may crosslink therein, forming a crosslinked gel. As used herein, the phrase "crosslinkable polymer composition" refers to a composition that under the appropriate conditions (e.g., time, temperature, the presence of an appropriate crosslinking agent) forms a crosslinked gel. As used herein, the phrase "crosslinked gel" refers to a semirigid, jelly-like mass formed when a polymer and crosslinking agent combine through a crosslinking reaction. The crosslinking of these compositions tends to produce crosslinked gels, which may eliminate, or at least reduce, the flow of water or other undesirable fluids through the natural fractures and high permeability streaks in the formations. One particular crosslinkable polymer composition involves the use of polyethyleneimine to crosslink a water-soluble polymer, such as an acrylamide-based polymer.

The time required for a crosslinkable polymer composition to form the desired crosslinked gel can vary widely. This length of time, sometimes referred to as "gelation time," varies, depending on a number of factors, including the type of crosslinking agent used, the type of polymer used, the type of aqueous fluid used, concentrations of components used, the pH, the temperature, and a variety of other factors. Delaying the gelation of a crosslinkable polymer composition may be desirable to allow, among other things, pumping of the composition to its desired location. The desired gelation time varies depending on the specific application. For instance, for wells of considerable depth or increased temperature, a longer gelation time may be required to deliver the crosslinkable composition to its desired destination before the composition forms the crosslinked gel.

In subterranean formations, a wide range of temperatures may be encountered presenting challenges to the use of crosslinkable polymer compositions therein. For example, if the temperature of the subterranean formation is sufficiently high, the crosslinkable polymer composition may gel prematurely. To counteract this undesirable possibility, oftentimes, the crosslinkable polymer composition must be designed such that its gelation time is delayed or retarded. That is, the thickening and gelation characteristics of the crosslinkable polymer composition must be altered such that the time it takes the crosslinkable polymer composition to form a crosslinked gel is delayed for an amount of time sufficient to permit the crosslinkable polymer composition to be pumped to its desired destination.

A number of methods for adjusting the gelation time of crosslinkable polymer compositions have heretofore been used. For instance, the gelation time of the above mentioned crosslinkable polymer compositions that comprise polyethyleneimine and a water-soluble polymer may be lengthened by increasing the level of bulky and/or less reactive monomers in the selected polymer or polymers used. Additionally, gel retarding additives (e.g., polyaspartic acid) have also been included in the crosslinkable polymer compositions to alter the gelation characteristics thereof. As used herein, the phrase "gel retarding additive" refers to an additive that acts to at least partially delay the crosslinking reaction between the water-soluble polymer the crosslinking agent. These modifications and/or retarders, however, may still be inadequate to provide the desired gelation times for certain applications.

SUMMARY

The present invention relates to treatment fluids useful in subterranean applications and more particularly, to crosslinkable polymer compositions that comprise an aqueous fluid, a water-soluble polymer comprising carbonyl groups, an organic crosslinking agent capable of crosslinking the water-soluble polymer comprising carbonyl groups, and a water-soluble carbonate retarder.

In one embodiment, the present invention provides a method comprising: providing a crosslinkable polymer composition comprising an aqueous fluid, a water-soluble polymer comprising carbonyl groups, an organic crosslinking agent capable of crosslinking the water-soluble polymer comprising carbonyl groups, and a water-soluble carbonate retarder; introducing the crosslinkable polymer composition into a portion of the subterranean formation; and allowing the crosslinkable polymer composition to form a crosslinked gel in the portion of the subterranean formation.

Another embodiment of the present invention provides a method of diverting a treatment fluid in a subterranean formation. An example of such a method comprises: providing a crosslinkable polymer composition comprising an aqueous fluid, a water-soluble polymer comprising carbonyl groups, an organic crosslinking agent capable of crosslinking the water-soluble polymer comprising carbonyl groups, and a water-soluble carbonate retarder; introducing the crosslinkable polymer composition into a portion of the subterranean formation, allowing the crosslinkable polymer composition to form a crosslinked gel in the portion of the subterranean formation; introducing the treatment fluid into a well bore penetrating the subterranean formation; and allowing the crosslinked gel to at least substantially divert the treatment fluid to another portion of the subterranean formation.

Another embodiment of the present invention provides a crosslinkable polymer composition comprising: an aqueous fluid; a water-soluble polymer comprising carbonyl groups; an organic crosslinking agent capable of crosslinking the water-soluble polymer comprising carbonyl groups; and a water-soluble carbonate retarder.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention and should not be used to limit or define the invention.

DESCRIPTION OF PREFERRED EMBODIMENTS

Figure 1:
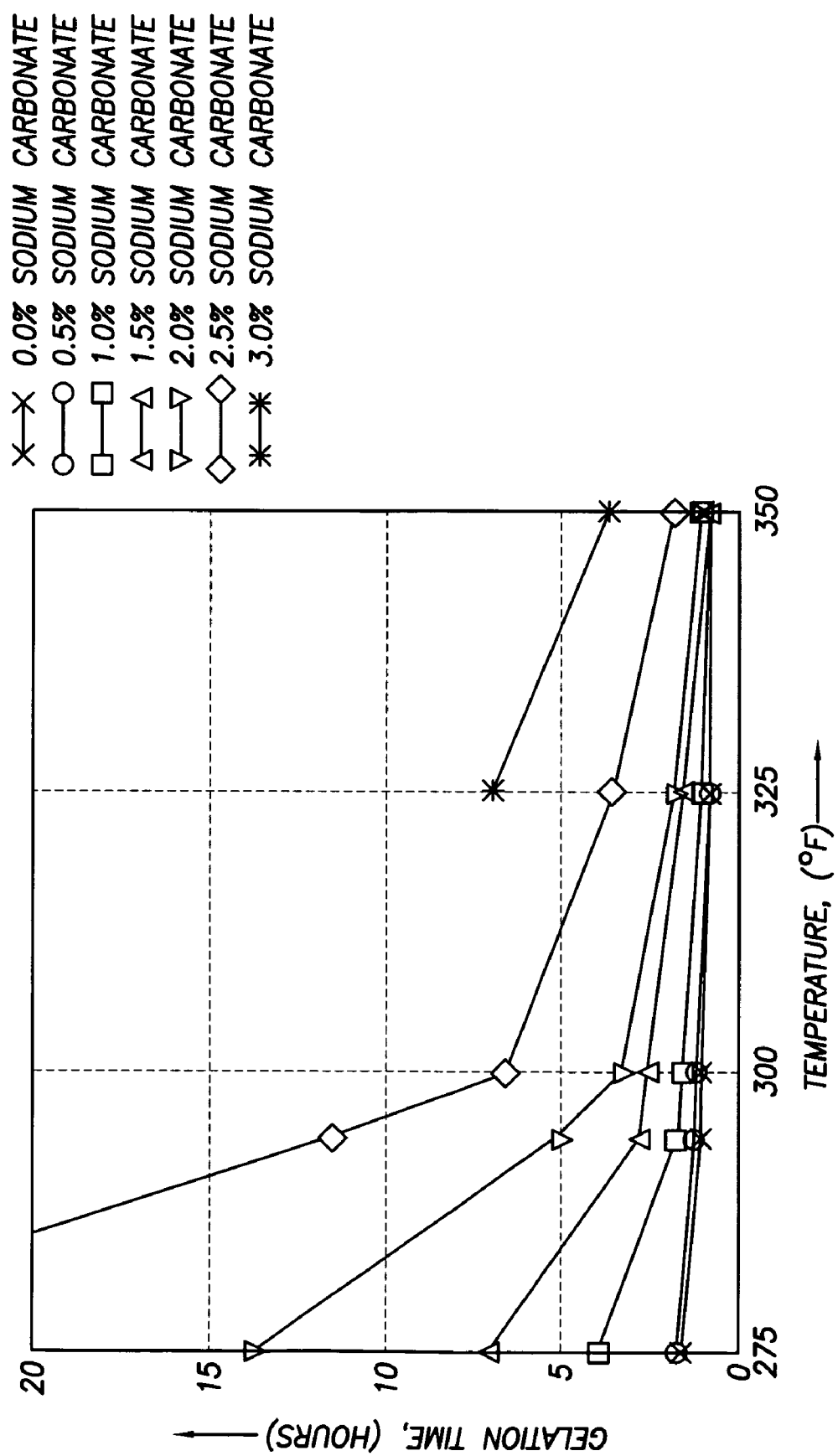
FIG. 1 is a graph of gelation time versus temperature as determined using a sealed-tube method for sample fluids containing varying concentrations of sodium carbonate.

The present invention relates to treatment fluids useful in subterranean applications and more particularly, to crosslinkable polymer compositions that comprise an aqueous fluid, a water-soluble polymer comprising carbonyl groups, an organic crosslinking agent capable of crosslinking the water-soluble polymer comprising carbonyl groups, and a water-soluble carbonate retarder. As used herein, the phrase "carbonate retarder" refers to a carbonate or bicarbonate salt that acts to at least partially delay the crosslinking reaction between the water-soluble polymer comprising carbonyl groups and the organic crosslinking agent. In certain embodiments, the compositions and methods of the present invention may be useful to alter, block, and/or control the flow of fluids in subterranean formations.

The crosslinkable polymer compositions of the present invention generally comprise an aqueous fluid, a water-soluble polymer comprising carbonyl groups, an organic crosslinking agent capable of crosslinking the water-soluble polymer comprising carbonyl groups, and a carbonate retarder. Generally, the water-soluble polymer comprising carbonyl groups should react, under appropriate conditions (e.g., time, temperature, the particular organic crosslinking agent chosen, etc.) with the organic crosslinking agent to form a crosslinked gel. Inclusion of the carbonate retarder in the crosslinkable polymer compositions of the present invention may delay this crosslinking reaction between the water-soluble polymer and the organic crosslinking agent, e.g., the gelation of the crosslinkable polymer compositions, so that the crosslinkable polymer compositions may be used in a wider range of applications than would be otherwise possible.

The aqueous fluid used for the crosslinkable polymer compositions of the present invention may include, but is not limited to, freshwater, seawater, saltwater, or brines (e.g., natural brines, formulated brines, etc.), or mixtures thereof. The aqueous fluid may be from any source, provided that it does not adversely affect the crosslinkable polymer compositions of the present invention. Formulated brines may be manufactured by dissolving one or more soluble salts in water, a natural brine, or seawater. Representative soluble salts include the chloride, bromide, acetate, and formate salts of potassium, sodium, calcium, magnesium, and zinc. In certain embodiments, the aqueous fluid may be present in the crosslinkable polymer compositions of the present invention in an amount in the range of from about 65% to about 99.5% by weight of the composition.

The crosslinkable polymer compositions of the present invention also comprise a water-soluble polymer comprising carbonyl groups. The carbonyl groups may be contained in pendant groups of the water-soluble polymer or contained in the polymer backbone. Examples of suitable carbonyl groups include, but are not limited to, esters, aldehydes, ketones, anhydrides, amides, and carboxylic acid groups. Suitable water-soluble polymers comprising carbonyl groups include, but are not limited to, saturated or unsaturated acrylamide-based polymers. Examples include, but are not limited to, polyacrylamide, acrylamide copolymers, polyvinyl pyrrolidone, 2-acrylamido-2-methylpropane sulfonic acid/acrylamide copolymers, sulfonated styrene/maleic anhydride copolymers, vinylpyrrolidone/2-acrylamido-2-methylpropane sulfonic acid/acrylamide terpolymers, acrylamide/t-butyl acrylate/N-vinylpyrrolidone terpolymers, acrylamide/t-butyl acrylate/2-acrylamido-2-methylpropane sulfonic acid terpolymers, 2-acrylamido-2-methylpropane sulfonic acid/N-N-dimethylacrylamide/acrylamide terpolymers, acrylamide/t-butyl acrylate/N-vinylpyrrolidone/2-acrylamido-2-methylpropane sulfonic acid tetrapolymers, acrylamide/t-butyl acrylate copolymers, and mixtures and derivatives thereof. Suitable water-soluble polymers comprising carbonyl groups are described in U.S. Pat. Nos. 5,836,392; 6,176,315; 6,192,986; and 6,196,317, the relevant disclosure of which are incorporate herein by reference. Those of ordinary skill in the art will recognize, with the benefit of this disclosure, that other suitable water-soluble polymers comprising carbonyl groups also may be used in the present invention.

In certain embodiments, the polymer comprising carbonyl groups includes oxidized starch. Examples of suitable starches include, but are not limited to, corn starch, potato starch, waxy maize, and dextrinized starch, and mixtures thereof. A wide variety of oxidizers can be used to oxidize starch. Examples of oxidizers suitable for use in the present invention include, but are not limited to, sodium hypochlorite, sodium periodate, hydrogen peroxide, and peracetic acid, and mixtures thereof. Those skilled in the art, with the benefit of this disclosure, will appreciate that related oxidized polysaccharides, other than oxidized starch, can be used to crosslink with the organic crosslinking agent, including oxidized cellulose, oxidized agarose, oxidized partially-acetylated cellulose, and oxidized gums, and mixtures thereof. Other compounds that may be used include dialdehyde starch (DAS) and dialdehyde cellulose, and mixtures thereof. In certain embodiments, the oxidized polysaccharides contain at least some ketone, aldehyde, or anhyride functional groups upon oxidation. In certain embodiments, the oxidized polysaccharides may be used in combination with any of the above-listed water-soluble polymers.

Generally, by increasing the fraction of bulky or less reactive monomers in the water-soluble polymer comprising carbonyl groups, the temperature at which gelation occurs may be increased and/or the pumping time at a given temperature may be increased. One of ordinary skill in the art with the benefit of this disclosure will recognize an appropriate water-soluble polymer comprising carbonyl groups based on, among other factors, the temperature of the formation and the desired pumping time.

The water-soluble polymers comprising carbonyl groups should be present in the crosslinkable polymer compositions of the present invention in an amount sufficient to provide the desired pumping time before gelation and the desired crosslinking reaction. In certain embodiments, the water-soluble polymers comprising carbonyl groups may be present in an amount in the range of from about 0.5% to about 20% by weight of the composition. In certain embodiments, the water-soluble polymer comprising carbonyl groups may be present in an amount in the range of from about 0.6% to about 12% by weight of the composition.

Suitable organic crosslinking agents should be capable of undergoing a crosslinking reaction with the water-soluble polymers that comprise carbonyl groups. Under the appropriate conditions (e.g., time, temperature), the organic crosslinking agent should react with the water-soluble polymer to form a crosslinked gel. Suitable organic crosslinking agents may contain amine groups that are capable of undergoing a crosslinking reaction with the water-soluble polymers that comprise carbonyl groups. Examples of suitable organic crosslinking agents include, but are not limited to, polyalkyleneimines (e.g., polyethyleneimine), polyalkylenepolyamines, polyfunctional aliphatic amines, arylalkylamines, heteroarylalkylamines, and mixtures thereof. In certain embodiments, the organic crosslinking agent comprises polyethyleneimine ("PEI").

The organic crosslinking agent should be included in the crosslinkable polymer compositions of the present invention in an amount sufficient to provide the desired crosslinking reaction. In certain embodiments, the organic crosslinking agent may be present in an amount in the range of from about 0.05% to about 15% by weight of the composition. In certain embodiments, the organic crosslinking agent may be present in an amount in the range of from about 0.5% to about 5% by weight of the composition.

To further modify the pumping time before gelation and other properties of the crosslinkable polymer compositions of the present invention, the weight ratio of the water-soluble polymer comprising carbonyl groups to the organic crosslinking agent may be varied. In some embodiments, the weight ratio of water-soluble polymer-to-organic crosslinking agent may be in the range of from about 400:1 to about 1.1:1. In some embodiments, the weight ratio of water-soluble polymer-to-organic crosslinking agent may be in the range of from about 50:1 to about 1.1:1.

The crosslinkable polymer compositions of the present invention further comprise a water-soluble carbonate retarder. The carbonate retarder generally should be water-soluble at either ambient temperature or at well bore temperatures prior to entering the subterranean formation. Among other things, the carbonate retarder may act to retard the crosslinking reaction between the water-soluble polymer comprising carbonyl groups and the organic crosslinking agent, e.g., the gelation of the crosslinkable polymer compositions. Delaying the gelation of the crosslinkable polymer compositions, in some embodiments, may be desirable to increase the pumping time before gelation at a given temperature. In certain embodiments, the crosslinkable polymer compositions of the present invention may have a gelation time of from about 2 hours to about 96 hours. In certain embodiments, the crosslinkable polymer compositions of the present invention may have a gelation time sufficient to allow delivery of the crosslinkable polymer composition to the desired portion of a subterranean formation before crosslinkable polymer composition becomes substantially viscosified. The addition of the carbonate retarder may allow the crosslinkable polymer compositions of the present invention to be used at higher temperatures than would otherwise be possible without the carbonate retarder. For example, the crosslinkable polymer compositions of the present invention may have gelation times suitable for use at temperatures greater than about 250° F. In some embodiments, the crosslinkable polymer compositions of the present invention may be suitable for use at temperatures in the range of from about 250° F. to about 350° F. In addition to the amount and type of the carbonate retarder included in the crosslinkable polymer compositions of the present invention, the gelation time varies depending on a number of factors, including the type of organic crosslinking agent used, the type of the water-soluble polymer used, the type of aqueous fluid used, concentrations of components used, the pH, the temperature, and a variety of other factors.

Suitable carbonate retarders include salts of alkali metals, for example, sodium carbonate, sodium bicarbonate, lithium carbonate, lithium bicarbonate, potassium carbonate, potassium bicarbonate, ammonium carbonate, ammonium bicarbonate, and combinations thereof and the like. In certain embodiments, the carbonate retarder comprises sodium carbonate. The carbonate retarder generally should be included in the crosslinkable polymer compositions of the present invention in an amount sufficient to provide the desired retardation of gelation. In certain embodiments, the carbonate retarder may be present in an amount in the range of from about 0.1% to about 10% by weight of the composition. In certain embodiments, the carbonate retarder may be present in an amount in the range of from about 0.5% to about 5% by weight of the composition.

The crosslinkable polymer compositions of the present invention optionally may comprise a gel retarding additive comprising a compound that is capable of acylating an organic amine and/or hydrolyzing or thermolyzing to produce one or more acids. Among other things, the gel retarding additive may act as a gel stabilizer, as well as retarding the crosslinking reaction between the water-soluble polymer comprising carbonyl groups and the organic crosslinking agent. Retarding the crosslinking in the crosslinkable polymer composition may be desirable to increase the pumping time before gelation at a given temperature. However, inclusion of the carbonate retarder in the crosslinkable polymer compositions of the present invention may allow the crosslinkable polymer compositions to be used at higher temperatures than use of the gel retarding additive comprising a compound that is capable of acylating an organic amine and/or hydrolyzing or thermolyzing to produce one or more acids. Examples of suitable compounds capable of acylating an organic amine and/or hydrolyzing or thermolyzing to produce one or more acids include, but are not limited to, anhydrides (e.g., acetic or propionic anhydride), esters (e.g., polylactate), amides (e.g., proteins), polyamides, imides (e.g., polysuccinimide), and polyacids (e.g., polyaspartic acid and polyglutamic acids) and salts thereof, and mixtures thereof. Polysuccinimide should hydrolyze or thermolyze in water to produce iminodisuccinic acid, polyaspartic acid or aspartic acid. In certain embodiments, the compounds capable of acylating an organic amine and/or hydrolyzing or thermolyzing to produce one or more acids comprises polysuccinimide, polyaspartic acid, or a mixture thereof.

The crosslinked gel formed by the reaction of the water-soluble polymer comprising carbonyl groups and the organic crosslinking agent should be stable for the desired period of time at the temperature of the subterranean formation. A relatively short gel stability may be preferred for temporarily sealing a portion of a subterranean formation, while a crosslinked gel having a long term stability may be useful in mitigating the flow of water from a formation into the well bore in producing wells or in sealing off high permeability portions of a subterranean formation that would otherwise accept most of an injected treatment fluid. The stability of the crosslinked gel should depend on a number of factors, including, but not limited to, the type of organic crosslinking agent used, the type of the water-soluble polymer used, the type of aqueous fluid used, concentrations of components used, the pH, the temperature, and a variety of other factors.

Generally, the methods of the present invention allow for treating a portion of a subterranean formation with the crosslinkable polymer compositions of the present invention. In certain embodiments, a method of treating a portion of a subterranean formation comprises: providing a crosslinkable polymer composition an aqueous fluid, a water-soluble polymer comprising carbonyl groups, an organic crosslinking agent capable of crosslinking the water-soluble polymer comprising carbonyl groups, and a carbonate retarder; introducing the crosslinkable polymer composition into the portion of the subterranean formation; and allowing the crosslinkable polymer composition to form a crosslinked gel in the portion of the subterranean formation. The crosslinked gel should modify the permeability of a portion of a subterranean formation so as to mitigate the undesired flow of fluids therethrough. In some embodiments, mitigation of the flow may eliminate or at least reduce fluid flow therethrough. In another embodiment, mitigation of the fluid flow may divert a treatment fluid, such as an acidizing treatment fluid, from a high permeability water producing portion of a formation to the desired treatment area of a hydrocarbon-producing portion of the formation.

In certain embodiments, a method of diverting a treatment fluid in a subterranean formation comprises: providing a crosslinkable polymer composition an aqueous fluid, a water-soluble polymer comprising carbonyl groups, an organic crosslinking agent capable of crosslinking the water-soluble polymer comprising carbonyl groups, and a carbonate retarder; introducing the crosslinkable polymer composition into a portion of a subterranean formation; allowing the crosslinkable polymer composition to form a crosslinked gel in the portion of the subterranean formation; and introducing the treatment fluid into a well bore that penetrates the subterranean formation; and allowing the crosslinked gel to at least substantially divert the treatment fluid to another portion of the subterranean formation. The diversion of treatment fluids in subterranean operations may be desirable in a variety of subterranean operations, including acid stimulation operations, injection operations, scale inhibition operations, and clay stabilization operations. In many instances, diversion may be desirable because the treatment fluid may preferentially enter portions of a subterranean formation with high permeability at the expense of portion of the subterranean formation with less permeability.

To facilitate a better understanding of the present invention, the following examples of certain aspects of some embodiments are given. In no way should the following examples be read to limit, or define, the scope of the invention.

EXAMPLE 1

For this series of tests, various samples were prepared by combining water, an acrylamide-t-butylacrylate copolymer solution (20% active in water), a PEI solution (33% active in water), and sufficient solid potassium chloride to provide the desired salt concentration. To this mixture, sodium carbonate was added in varying concentrations (0% to 3.0%) for each sample. The composition of each sample is indicated in Table 1 below.

TABLE 1

| | Sample Fluid Compositions | | | | |
|---|---|---|---|---|---|
| Sample | Acrylamide-t-butylacrylate,[1] % by wt | PEI,[2] % by wt | Sodium Carbonate, % by wt | Potassium Chloride, % by wt | Water, % by wt |
| No. 1 | 15 | 2 | 0 | 10 | 73.0 |
| No. 2 | 15 | 2 | 0.5 | 10 | 72.5 |
| No. 3 | 15 | 2 | 1.0 | 10 | 72.0 |
| No. 4 | 15 | 2 | 1.5 | 10 | 71.5 |
| No. 5 | 15 | 2 | 2.0 | 10 | 71.0 |
| No. 6 | 15 | 2 | 2.5 | 10 | 70.5 |
| No. 7 | 15 | 2 | 3.0 | 10 | 70.0 |

[1]The acrylamide-t-butylacrylate was a 20% active solution by weight in water.
[2]The PEI was a 33% active solution by weight in water.

Once prepared, gelation times of the sample fluids were measured at various temperatures for each of the sample fluids. The gelation times for the sample fluids were measured using a sealed-tube method. A 16 mm×150 mm borosilicate glass tube with a cap was filled with a sample fluid to approximately one-third of its capacity. The tube was purged with nitrogen, and the screw cap was sealed with a high-temperature silicone sealant. Additionally, a Teflon® plug was used inside the cap. The tube was then placed inside a heavy steel container, and the container was placed in a preheated oven set at the test temperature indicated in Table 2. The steel container was taken out periodically and the tube removed for observation. The gelation time for this example was the time required for the sample fluid to reach a specified gel strength based on the visual evaluation. Table 2 shows gelation time measurements for each of the sample fluids that were prepared. A graph of gelation time versus temperature is provided as FIG. 1.

TABLE 2

Gelation Time Measurements

| Temp., °F. | Gelation Time, Hours | | | | | | |
|---|---|---|---|---|---|---|---|
| | No. 1 0% by wt $Na_2CO_3$ | No. 2 0.5% by wt $Na_2CO_3$ | No. 3 1.0% by wt $Na_2CO_3$ | No. 4 1.5% by wt $Na_2CO_3$ | No. 5 2.0% by wt $Na_2CO_3$ | No. 6 2.5% by wt $Na_2CO_3$ | No. 7 3.0% by wt $Na_2CO_3$ |
| 275 | 1.5 | 1.75 | 3.93 | 7.02 | 13.62 | 30.18 | — |
| 294 | 1.0 | 1.25 | 1.75 | 2.75 | 5.0 | 11.5 | — |
| 300 | 1.0 | 1.25 | 1.5 | 2.5 | 3.25 | 6.5 | — |
| 325 | 0.75 | 0.75 | 1.0 | 1.5 | 1.75 | 3.52 | 6.93 |
| 350 | 0.75 | 0.75 | 0.75 | 0.75 | 1.0 | 1.75 | 3.68 |

Thus, Example 1 indicates, among other things, that sodium carbonate may provide desired retardation of gelation times at relatively high temperatures (e.g., greater than about 250° F.).

EXAMPLE 2

For this series of tests, various samples were prepared by combining water, an acrylamide-t-butylacrylate copolymer solution (20% active in water), a PEI solution (33% active in water), and sufficient solid potassium chloride to provide the desired salt concentration. The concentration of potassium chloride (2%, 7%, or 10%) included in each sample was varied. To this mixture, sodium carbonate was added in varying concentrations (0.5% to 2.5%) for each sample. The composition of each sample is indicated in Table 3 below.

TABLE 3

Sample Fluid Compositions

| Sample | Acrylamide-t-butylacrylate,[1] % by wt | PEI,[2] % by wt | Sodium Carbonate, % by wt | Potassium Chloride, % by wt | Water, % by wt |
|---|---|---|---|---|---|
| No. 8 | 15 | 2 | 0.5 | 2 | 80.5 |
| No. 9 | 15 | 2 | 0.5 | 7 | 73.5 |
| No. 10 | 15 | 2 | 0.5 | 10 | 70.5 |
| No. 11 | 15 | 2 | 1.0 | 2 | 80 |
| No. 12 | 15 | 2 | 1.0 | 7 | 73 |
| No. 13 | 15 | 2 | 1.0 | 10 | 70 |
| No. 14 | 15 | 2 | 1.5 | 2 | 79.5 |
| No. 15 | 15 | 2 | 1.5 | 7 | 72.5 |
| No. 16 | 15 | 2 | 1.5 | 10 | 69.5 |
| No. 17 | 15 | 2 | 2.0 | 2 | 79 |
| No. 18 | 15 | 2 | 2.0 | 7 | 72 |
| No. 19 | 15 | 2 | 2.0 | 10 | 69 |
| No. 20 | 15 | 2 | 2.5 | 2 | 78.5 |
| No. 21 | 15 | 2 | 2.5 | 7 | 71.5 |
| No. 22 | 15 | 2 | 2.5 | 10 | 68.5 |

[1]The acrylamide-t-butylacrylate was a 20% active solution by weight in water.
[2]The PEI was a 33% active solution by weight in water.

Figure 2:
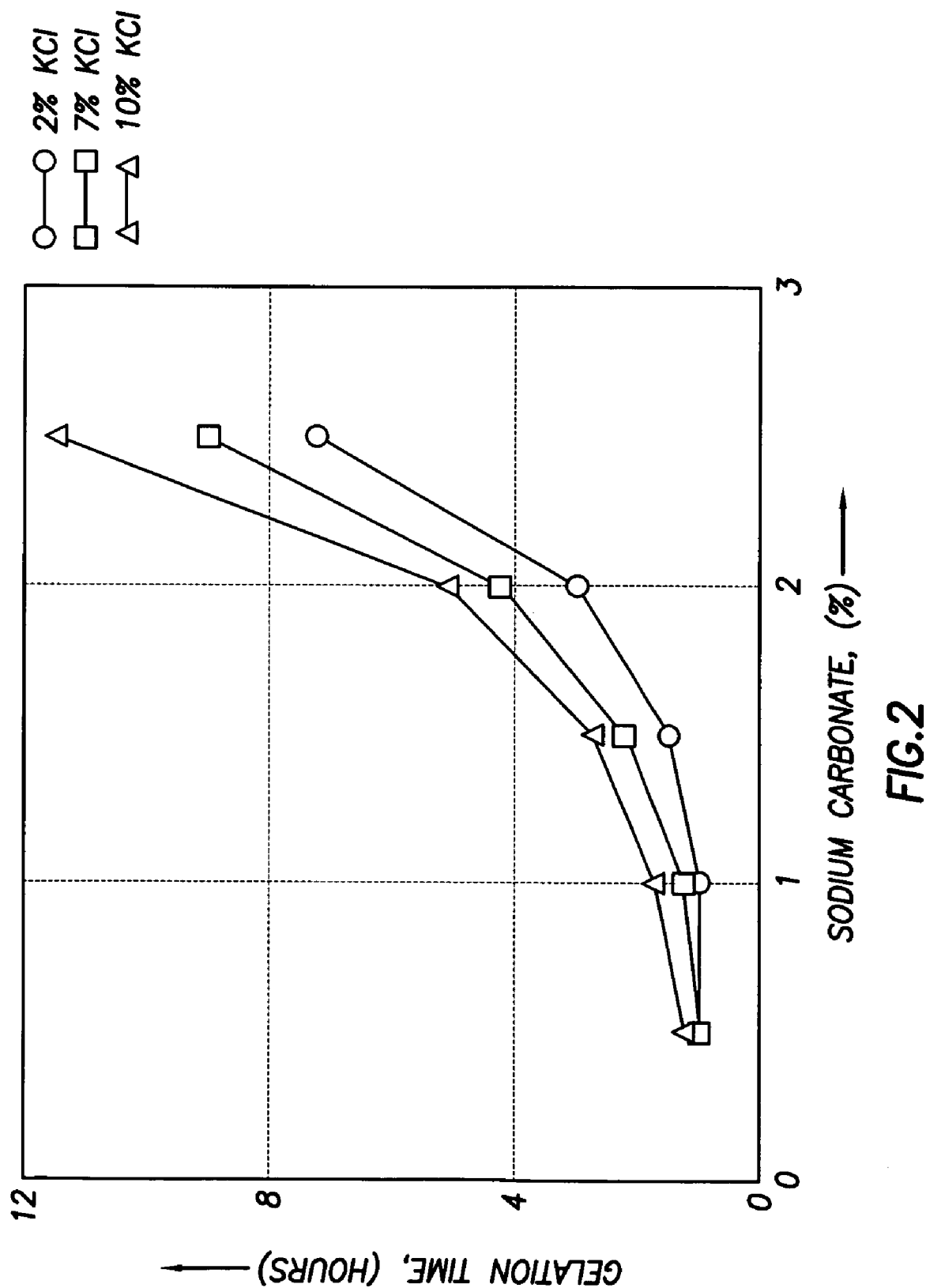
FIG. 2 is a graph of gelation time versus sodium carbonate concentration as determined using a sealed-tube method for sample fluids containing varying concentrations of sodium carbonate.

Once prepared, gelation times of the sample fluids were measured at 294° F. for each of the sample fluids. The gelation times for the sample fluids were measured using a sealed-tube method. A 16 mm×150 mm borosilicate glass tube with a cap was filled with a sample fluid to approximately one-third of its capacity. The tube was purged with nitrogen, and the screw cap was sealed with a high-temperature silicone sealant. Additionally, a Teflon® plug was used inside the cap. The tube was then placed inside a heavy steel container, and the container was placed in a preheated oven set at 294° F. The steel container was taken out periodically and the tube removed for observation. The gelation time for this example was the time required for the sample fluid to reach a specified gel strength based on the visual evaluation. The results of these tests are shown in FIG. 2, a graph of gelation time versus sodium carbonate concentration for each of the sample fluids that were prepared.

Thus, Example 2 indicates that sodium carbonate may provide desired retardation of gelation times at relatively high temperatures (e.g., greater than about 250° F.) with varying concentrations of potassium chloride. In addition, gelation time increase for higher concentrations of potassium chloride.

EXAMPLE 3

For this series of tests, Sample No. 23 was prepared by combining water, an acrylamide-t-butylacrylate copolymer solution (20% active in water), a PEI solution (33% active in water), sodium carbonate, and sufficient solid potassium chloride to provide the desired salt concentration. Sample No. 23 comprised water in an amount of 71% by weight, potassium chloride in an amount of 10% by weight, an acrylamide-t-butylacrylate copolymer solution (20% active in water) in an amount of 15% by weight, a PEI solution (33% active in water) in an amount of 2% by weight, and sodium carbonate in an amount of 2% by weight.

Permeability reduction tests were performed using Sample No. 23 and a regular Hassler sleeve containing a Berea sandstone core. The Hassler sleeve allowed measurement of the pressure differential along the core to determine the initial and final permeability of the core. These permeability reduction tests were performed at 300° F. Further, this test was conducted using a brine containing 2% by weight potassium chloride.

The following procedure was used for this series of tests, the results of which are provided in Table 4 below. For this test, the core experienced a flow sequence of 1) brine, 2) oil (kerosene), 3) brine, 4) sample fluid, 5) brine. The first two flow steps of brine and oil prepared the core for the test. The third brine flow in step 3 was maintained until the pressure stabilized, yielding an initial core permeability ($K_i$) at oil saturation, listed in Table 4 below as "Initial Core Permeability." After the third brine flow, Sample No. 23 was flowed into the core in step 4 and allowed to gel therein overnight, i.e., for a period of approximately 18 hours. The flow of Sample No. 23 was in the opposite direction of the brine and oil flow to simulate the treatment of a production well. Thereafter, the brine was reestablished in step 5 until the pressure stabilized, yielding a final core permeability ($K_f$) after treatment, listed in Table 4 below as "Final Core Permeability." The Initial and Final Core Permeabilities were utilized to determine a percent permeability reduction ("PPR") according to the following formula:

$$PPR = 100\left(1 - \frac{K_f}{K_i}\right)$$

The results of this test are provided in Table 4 below.

TABLE 4

| Parameters | Berea Core |
| --- | --- |
| Treatment | Sample No. 23 |
| Initial Core Permeability, mD | 228 |

TABLE 4-continued

| Parameters | Berea Core |
| --- | --- |
| Final Core Permeability, mD | 0.020[1] |
| % Permeability Reduction | 99.9% |

[1]At ΔP~1573 psia, Q = 0.44 mL/min

This example indicates, inter alia, that an example of a crosslinkable polymer composition of the present invention may provide a desirable level of permeability reduction.

EXAMPLE 4

For this series of tests, sample fluids were prepared by combining water, an acrylamide-t-butylacrylate copolymer solution (20% active in water), a PEI solution (33% active in water), sodium carbonate, and sufficient solid potassium chloride to provide the desired salt concentration. Certain sample fluids also contained polyaspartic acid ("PAA"). The composition of each sample is indicated in Table 5 below.

Permeability reduction tests were performed using the sample fluids and a regular Hassler sleeve containing a sandstone core. The Hassler sleeve allowed measurement of the pressure differential along the core to determine the initial and final permeability of the core. These permeability reduction tests were performed at 275° F. Further, this test was conducted using a brine containing 6% by weight potassium chloride.

The following procedure was used for this series of tests, the results of which are provided in Table 5 below. For this test, the core experienced a flow sequence of 1) brine, 2) sample fluid, 3) brine. The first brine flow in step 1 was maintained until the pressure stabilized, yielding an initial core permeability ($K_i$), listed in Table 5 below as "Initial Core Permeability." After the first brine flow, the sample fluid was flowed into the core in step 2 and allowed to gel therein overnight, i.e., for a period of approximately 18 hours. The flow of the sample fluid was in the opposite direction of the brine flow to simulate the treatment of a production well. Thereafter, the brine was reestablished in step 3 until the pressure stabilized, yielding a final core permeability ($K_f$) after treatment, listed in Table 5 below as "Final Core Permeability." The Initial and Final Core Permeabilities were utilized to determine the PPR in accordance with the procedure from Example 3.

The results of this test are provided in Table 5 below.

TABLE 5

| | Sample Fluid Composition | | | | | | Test Summary | | |
| --- | --- | --- | --- | --- | --- | --- | --- | --- | --- |
| Sample | Acrylamide-t-butylacrylate,[1] % by wt | PEI,[2] % by wt | Na$_2$CO$_3$, % by wt | PAA, % by wt | KCl, % by wt | Water, % by wt | $K_i$, mD | $K_f$, mD | PPR |
| No. 1 | 25 | 2 | 2 | 2 | 10 | 56 | 178 | 0.05[3] | 99.97 |
| No. 2 | 25 | 2 | 2.5 | 0 | 10 | 57.5 | 338 | 23.2[4] | 93.14 |
| No. 3 | 15 | 2 | 1.5 | 2 | 10 | 66.5 | 1.41 | 0.18[5] | 87.23 |
| No. 4 | 15 | 2 | 1.5 | 0 | 10 | 68.5 | 891 | 224[6] | 74.86 |

[1]The acrylamide-t-butylacrylate was a 20% active solution by weight in water.
[2]The PEI was a 33% active solution by weight in water.
[3]At ΔP ~1,828 psia, Q = 1 mL/min
[4]At ΔP ~13.07 psia, Q = 5 mL/min
[5]At ΔP ~842 psia, Q = 5 mL/min
[6]At ΔP ~1.02 psia, Q = 2 mL/min Thus, Example 4 indicates, inter alia, that an example of a crosslinkable polymer composition of the present invention may provide a desirable level of permeability reduction.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method comprising:
   providing a crosslinkable polymer composition comprising an aqueous fluid, a water-soluble polymer comprising carbonyl groups, an organic crosslinking agent that comprises an amine group that is capable of crosslinking the water-soluble polymer comprising carbonyl groups, and a water-soluble carbonate retarder;
   introducing the crosslinkable polymer composition into a portion of a subterranean formation, wherein the portion of the subterranean formation has a temperature of about 250° F. or greater; and
   allowing the crosslinkable polymer composition to form a crosslinked gel in the portion of the subterranean formation.

2. The method of claim 1 wherein the water-soluble polymer comprising carbonyl groups comprises at least one of the following: an acrylamide-based polymer or an oxidized polysaceharide.

3. The method of claim 1 wherein the organic crosslinking agent that comprises an amine group that is capable of crosslinking the water-soluble polymer comprising carbonyl groups is selected from the group consisting of: a polyalkyleneimine; a polyethyleneimine, a polyalkylenepolyamine, a polyfunctional aliphatic amine, an arylalkylamine, a heteroarylalkylamine, and combinations thereof.

4. The method of claim 1 wherein the carbonate retarder comprises a salt of an alkali metal.

5. The method of claim 1 wherein the carbonate retarder is selected from the group consisting of: sodium carbonate, sodium bicarbonate, lithium carbonate, lithium bicarbonate, potassium carbonate, potassium bicarbonate, ammonium carbonate, ammonium bicarbonate, and combinations thereof.

6. The method of claim 1;
wherein the water-soluble polymer comprising carbonyl groups comprises an acrylamide/t-butyl acrylate copolymer;
wherein the organic crosslinking agent that comprises an amine group that is capable of crosslinking the water-soluble polymer comprising carbonyl groups comprises polyethyleneimine; and
wherein the carbonate retarder comprises sodium carbonate.

7. The method of claim 1 wherein the crosslinked gel modifies the permeability of the portion of the subterranean formation so as to mitigate the flow of fluids through the portion of the subterranean formation.

8. The method of claim 1 wherein the crosslinkable polymer composition further comprises a gel retarding additive comprising a compound that is capable of acylating an organic amine and/or hydrolyzing or thermolyzing to produce one or more acids.

9. The method of claim 8 wherein the compound that is capable of acylating an organic amine and/or hydrolyzing or thermolyzing to produce one or more acids is selected from the group consisting of: an anhydride; an ester; an amide; a polyamide; an imide; a polyacid a salt of a polyacid, and combinations thereof.

10. A method of diverting a treatment fluid in a subterranean formation, comprising:
providing a crosslinkable polymer composition comprising an aqueous fluid, a water-soluble polymer comprising carbonyl groups, an organic crosslinking agent capable of crosslinking the water-soluble polymer comprising carbonyl groups, and a water-soluble carbonate retarder;
introducing the crosslinkable polymer composition into a portion of a subterranean formation, wherein the portion of the subterranean formation has a temperature of about 250° F. or greater;
allowing the crosslinkable polymer composition to form a crosslinked gel in the portion of the subterranean formation;
introducing the treatment fluid into a well bore penetrating the subterranean formation; and
allowing the crosslinked gel to at least substantially divert the treatment fluid to another portion of the subterranean formation.

11. The method of claim 10 wherein the carbonate retarder comprises at least one of the following: sodium carbonate, sodium bicarbonate, lithium carbonate, lithium bicarbonate, potassium carbonate, potassium bicarbonate, ammonium carbonate, or ammonium bicarbonate.

12. The method of claim 10:
wherein the water-soluble polymer comprising carbonyl groups comprises an acrylamide/t-butyl acrylate copolymer;
wherein the organic crosslinking agent comprises polyethyleneimine; and
wherein the carbonate retarder comprises sodium carbonate.

13. A method comprising:
providing a crosslinkable polymer composition comprising an aqueous fluid, an acrylamide/t-butyl acrylate copolymer, an organic crosslinking agent that comprises polyethyleneimine, and a water-soluble carbonate retarder that comprises sodium carbonate;
introducing the crosslinkable polymer composition into a portion of a subterranean formation; and
allowing the crosslinkable polymer composition to form a crosslinked gel in the portion of the subterranean formation.

14. The method of claim 13 wherein the crosslinked gel modifies the permeability of the portion of the subterranean formation so as to mitigate the flow of fluids through the portion of the subterranean formation.

15. The method of claim 13 wherein the crosslinkable polymer composition further comprises a gel retarding additive comprising a compound that is capable of acylating an organic amine and/or hydrolyzing or thermolyzing to produce one or more acids.

16. The method of claim 15 wherein the compound that is capable of acylating an organic amine and/or hydrolyzing or thermolyzing to produce one or more acids is selected from the group consisting of: an anhydride; an ester; an amide; a polyamide; an imide; a polyacid, a salt of a polyacid, and combinations thereof.

* * * * *